United States Patent
Tata et al.

(10) Patent No.: US 7,278,940 B2
(45) Date of Patent: Oct. 9, 2007

(54) POWERTRAIN WITH ELECTRICALLY VARIABLE TRANSMISSION PROVIDING IMPROVED GRADEABILITY

(75) Inventors: Anthony P. Tata, Fenton, MI (US); Kyle K. Kinsey, Fenton, MI (US); Robert D. Burns, Lake Orion, MI (US); Brendan M. Conlon, Rochester Hills, MI (US); Donald P. Pfaff, Washington, MI (US); Mark A. Theobald, Bloomfield Hills, MI (US); Mark A. Damico, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 170 days.

(21) Appl. No.: 11/010,552

(22) Filed: Dec. 13, 2004

(65) Prior Publication Data

US 2006/0128513 A1    Jun. 15, 2006

(51) Int. Cl.
*F16H 3/72* (2006.01)
(52) U.S. Cl. ............. 475/5; 475/277; 475/282; 475/288; 477/4; 477/97; 477/107; 180/65.2; 180/65.4; 180/65.7; 192/221; 192/222
(58) Field of Classification Search ............. 475/5, 475/277, 282, 288; 477/3, 4, 97, 107; 180/65.2, 180/65.3, 65.4, 65.6, 65.7; 903/911, 917, 903/918, 919; 192/85 R, 218, 221, 222
See application file for complete search history.

(56) References Cited

U.S. PATENT DOCUMENTS

| | | | |
|---|---|---|---|
| 4,122,930 A | 10/1978 | Bennett et al. | 192/84 C |
| 4,428,470 A | 1/1984 | Bennett et al. | 192/84 C |
| 5,009,301 A | 4/1991 | Spitler | 192/106.2 |
| 5,377,799 A | 1/1995 | Mullaney | 192/84 C |
| 5,558,588 A | 9/1996 | Schmidt | 475/5 |
| 5,730,675 A * | 3/1998 | Yamaguchi | 475/2 |
| 5,931,757 A | 8/1999 | Schmidt | 475/2 |
| 5,993,351 A * | 11/1999 | Deguchi et al. | 477/5 |
| 6,321,704 B1 | 11/2001 | Church et al. | 123/90.16 |
| 6,321,705 B1 | 11/2001 | Fernandez et al. | 123/90.16 |
| 6,497,207 B2 | 12/2002 | Spath et al. | 123/90.16 |
| 6,513,470 B1 | 2/2003 | Hendriksma et al. | 123/90.16 |
| 6,557,518 B1 | 5/2003 | Albertson et al. | 123/198 F |
| 6,584,951 B1 | 7/2003 | Patel et al. | 123/198 F |
| 6,637,387 B1 | 10/2003 | Gecim et al. | 123/90.16 |
| 7,108,087 B2 * | 9/2006 | Imai | 180/65.2 |
| 2003/0104901 A1 * | 6/2003 | Fukushima et al. | 477/3 |

* cited by examiner

*Primary Examiner*—David D. Le

(57) ABSTRACT

A powertrain includes an engine with an engine output member and a transmission with two motor/generators and a transmission input member operatively connected to the engine output member. A control unit is configured to selectively cause a device to resist or prevent rotation of the input member in response to the existence of certain conditions, such as the engine not supplying torque to the transmission and the transmission being in reverse operating mode. Resisting or preventing rotation of the input member improves transmission performance when only the motor/generators are supplying torque to propel the vehicle. A corresponding method is also provided.

4 Claims, 3 Drawing Sheets

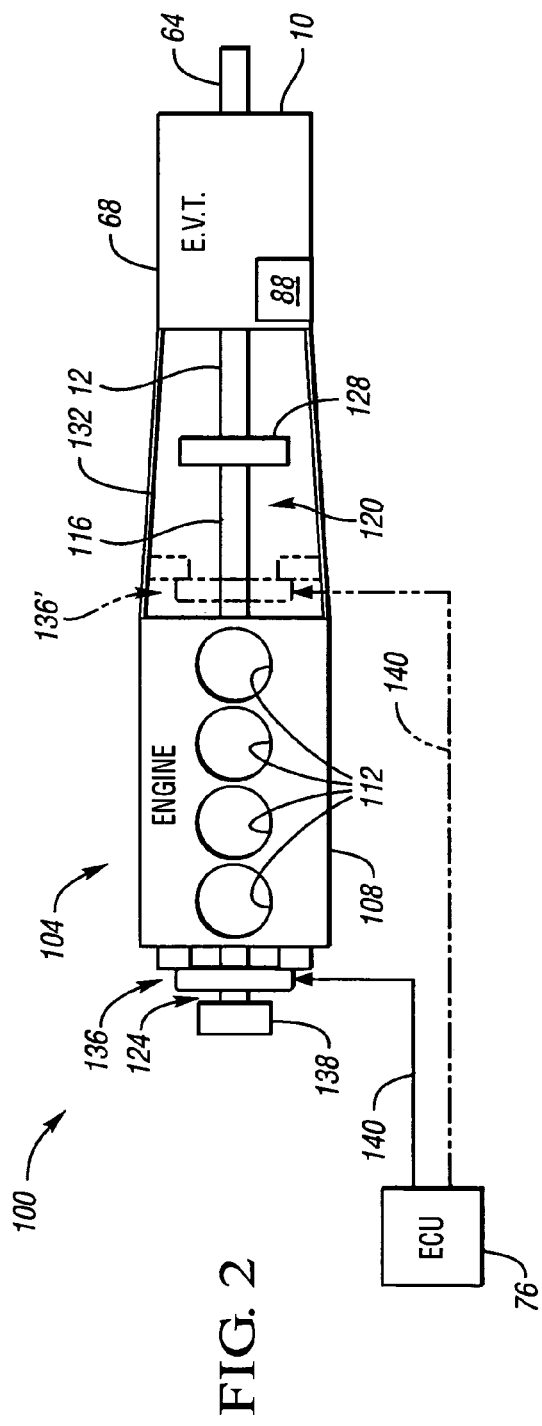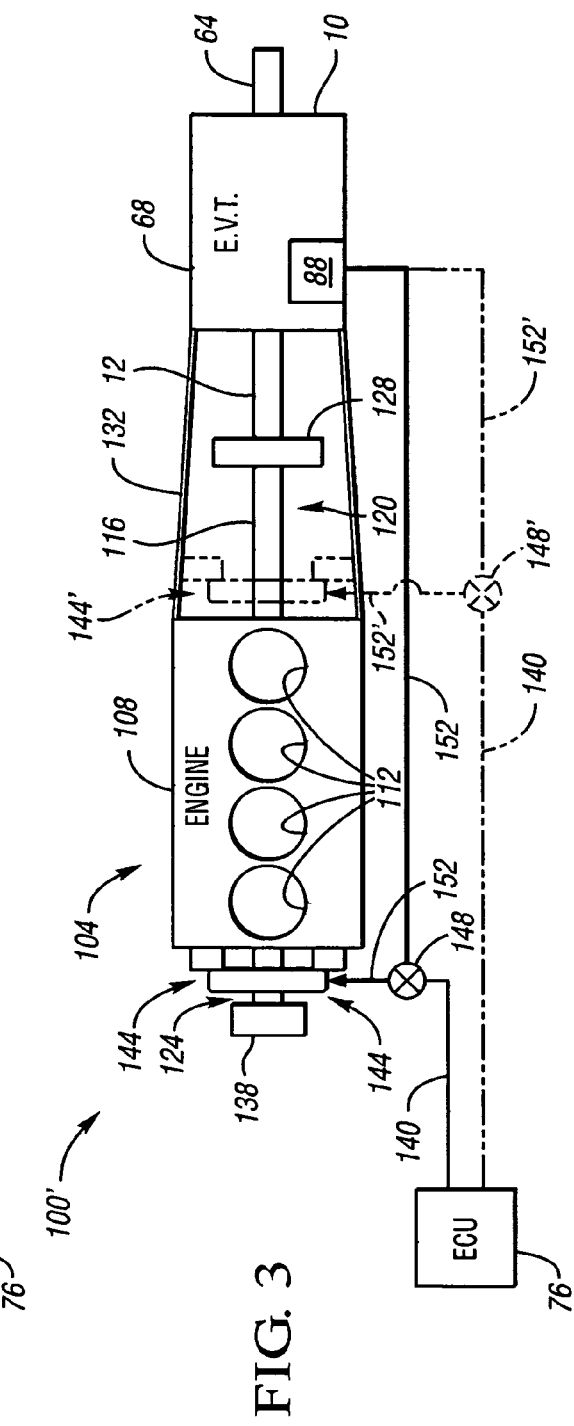

POWERTRAIN WITH ELECTRICALLY VARIABLE TRANSMISSION PROVIDING IMPROVED GRADEABILITY

TECHNICAL FIELD

This invention relates to vehicle powertrains having an engine connected to the input member of an electrically variable transmission, and a device configured to selectively resist or prevent rotation of the input member.

BACKGROUND OF THE INVENTION

Electrically variable vehicle transmissions (EVTs), such as those described in U.S. Pat. No. 5,931,757, employ two electric motor/generators. The electric motor/generators are coaxially oriented with an input shaft connectable to an engine, an output shaft, and a differential gearing arrangement. Each motor/generator is operatively connected to the differential gearing arrangement to provide a range or mode of transmission operation characterized by a continuously variable speed ratio between the input shaft and the output shaft.

An EVT may be operated in a purely electrical mode wherein the engine is off, or disconnected from the input member, and only the motor/generators supply torque to propel the vehicle. With some EVTs, the motor/generators do not have a reaction member against which to "push" when supplying torque for the output member in reverse mode and with the engine off or disconnected. To compensate, a first motor/generator may provide reverse torque for the output member while a second motor/generator acts on the input member to provide a reaction torque for the first motor/generator. In a powertrain having an engine connected to an electrically variable transmission without an input clutch, the crankshaft is continuously connected to the transmission input member for substantially unitary rotation therewith, and the second motor/generator therefore rotates the crankshaft and motors the engine during purely electrical reverse operation.

SUMMARY OF THE INVENTION

A vehicle powertrain is provided. The powertrain includes an engine having an engine output member such as a crankshaft. A transmission has a transmission input member connected to the engine output member for rotation therewith, a transmission output member, a geartrain configured to selectively operatively interconnect the transmission input member and the transmission output member, and first and second motor/generators configured to supply power to, or receive power from, the geartrain.

The powertrain also includes a device sufficiently configured to selectively resist or prevent rotation of the input member, and a control unit that is configured to selectively cause the device to resist or prevent rotation of the input member, at least partially in response to the engine being in the off condition.

The powertrain improves reverse operation of the transmission in purely electric mode, i.e., when the engine is off, by providing reaction torque so that both motor/generators can supply torque to the output member. In other words, the motor/generators can "push" off the input shaft so that one of the motor/generators need not motor the engine while providing a reaction torque for the other motor/generator.

The powertrain is preferably characterized by the absence of an input clutch between the input member and the crankshaft so that the input member and the crankshaft are continuously connected for substantially unitary rotation. The device is preferably connected to the crankshaft to prevent or resist crankshaft rotation, and thus prevent or resist input member rotation. Exemplary devices for preventing rotation of the crankshaft include an electromagnetic clutch configured to selectively lock the crankshaft, and a hydraulically-actuated disk brake configured to selectively lock the crankshaft.

A corresponding method is also provided. The method includes monitoring whether a crankshaft is actively supplying torque to a transmission input member, and causing resistance to input member rotation at least partially in response to the crankshaft not actively supplying torque to the input member. For example, a powertrain may include devices, such as a transmission hydraulic pump or an engine coolant pump, that resist crankshaft or input member rotation, but have functionality apart from resisting crankshaft or input member rotation. These devices are controllable to vary the resistance to rotation of the crankshaft or input member. For example, the powertrain controller may command maximum pump volume from an engine cooling pump or the transmission hydraulic pump to increase rotational resistance to the crankshaft or the input member and thus provide reaction torque for the motor/generators during launch in reverse mode with the engine off.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic representation of a powertrain including the transmission of FIG. 1 operatively connected to an engine, and an electromechanical clutch configured to selectively lock the engine crankshaft;

FIG. 3 is a schematic representation of an alternative embodiment of the powertrain of FIG. 2 having a hydraulically-actuated friction brake configured to selectively lock the engine crankshaft;

DESCRIPTION OF THE PREFERRED EMBODIMENTS

Figure 1:
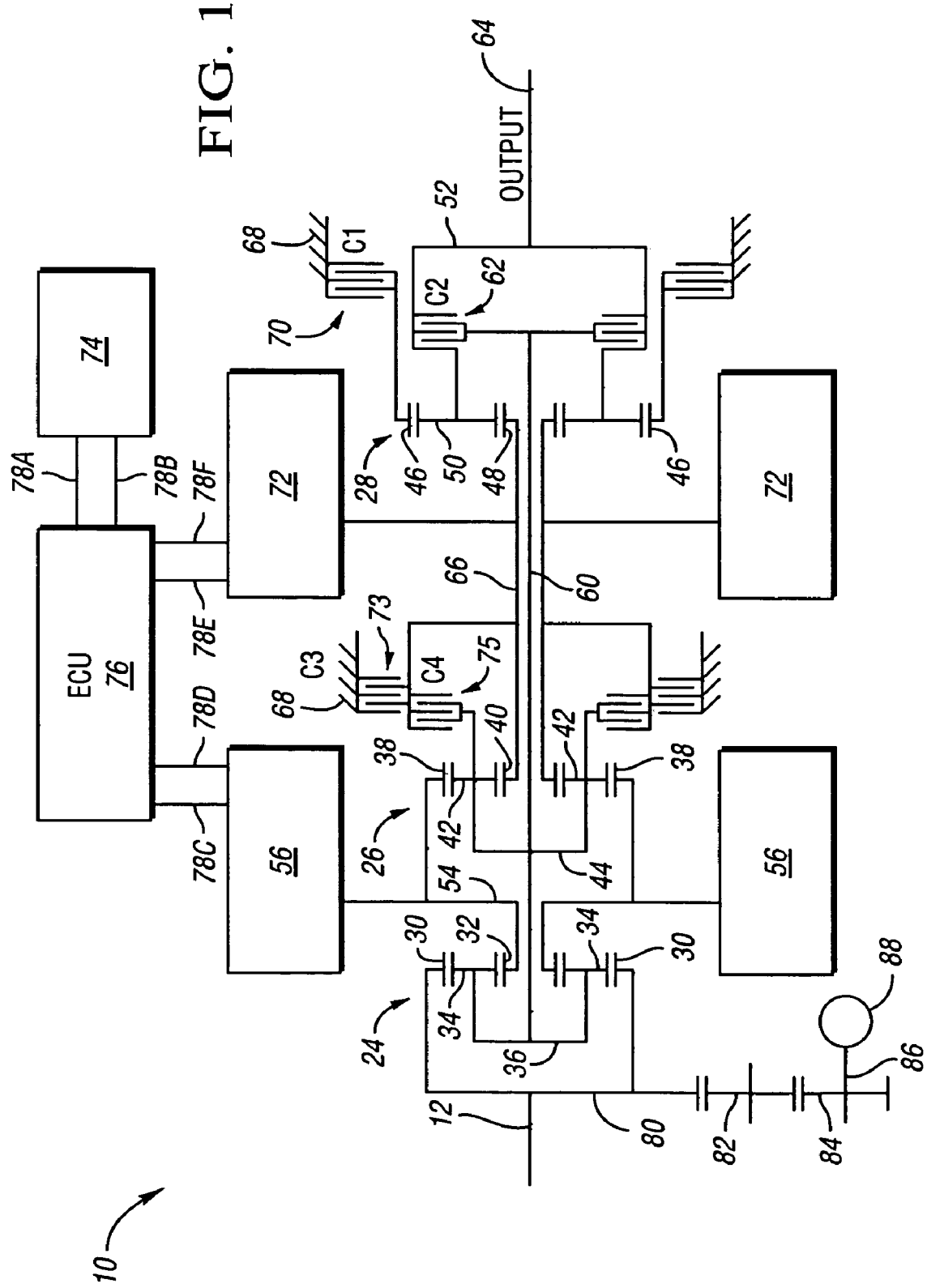
FIG. 1 is a schematic representation of a two-mode, compound-split, electromechanical transmission.

Referring to FIG. 1, an electrically variable, hybrid transmission 10 is schematically depicted. The hybrid transmission 10 has an input member 12 that may be in the nature of a shaft. The input member 12 is connected to a planetary gear set 24 in the transmission 10.

The hybrid transmission 10 utilizes three planetary gear sets 24, 26 and 28. The first planetary gear set 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear member 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear member 50 meshingly engages both the outer gear member 46 and the inner gear member 48.

In this embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10.

The carrier 52 of the third planetary gear set 28 is connected directly to the transmission output member 64. When the hybrid transmission 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72. All the planetary gear sets 24, 26 and 28 as well as the two motor/generators 56 and 72 are coaxially oriented, as about the axially disposed shaft 60. It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e., the circumferential dimension—of the transmission 10 is minimized.

A torque transfer device 73 selectively connects the sun gear 40 with ground (i.e., with transmission housing 68). A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches.

As should be apparent from the foregoing description, and with particular reference to FIG. 1, the transmission 10 selectively receives power from an engine, shown at 104 in FIG. 2, through the input member 12. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F. Those skilled in the art will recognize that more transfer conductors than those shown in FIG. 1 may be desirable or necessary, depending upon the configuration of the motor/generators 56, 72. For example, if the motor/generators 56, 72 are three-phase motors, three transfer conductors will be employed between the ECU 76 and each motor/generator 56, 72.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings.

A drive gear 80 may be presented from the input member 12. As depicted, the drive gear 80 fixedly connects the input member 12 to the outer gear member 30 of the first planetary gear set 24, and the drive gear 80, therefore, receives power from the engine and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

The transmission 10 is a two-mode, compound-split, electro-mechanical, vehicular transmission. In other words, the output member 64 receives power through two distinct gear trains within the transmission 10. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Exemplary operation of the transmission is described in a commonly-assigned U.S. Ser. No. 10/946,915 filed Sep. 22, 2004, entitled "Two-Mode, Compound-Split, Hybrid Electro-Mechanical Transmission Having Four Fixed Ratios," and which is hereby incorporated by reference in its entirety.

Referring to FIG. 2, wherein like reference numbers refer to like components from FIG. 1, a vehicle powertrain 100 is schematically depicted. The powertrain 100 includes an engine 104 having an engine block 108 that defines a plurality of cylinders 112. The engine is characterized by an on condition and an off condition, as understood by those skilled in the art.

The engine 104 further includes an output member such as crankshaft 116, which is characterized by a first end 120 and a second end 124. The first end 120 of the crankshaft 116 is connected to the input member 12 of the transmission 10. The input member 12 may be directly driven by the crankshaft 116, or a transient torque damper 128 may be incorporated between the crankshaft 116 and the input member 12. An example of a transient torque damper of the type recommended for the present usage is disclosed in detail in U.S. Pat. No. 5,009,301, issued Apr. 23, 1991, to General Motors Corporation, and which is hereby incorporated by reference in its entirety. Thus, the crankshaft 116 and the input member 12 are substantially continuously connected for unitary rotation, i.e., there is no selectively disengageable input clutch or torque converter between the input member 12 and the crankshaft 116. A bell housing 132 extends between the engine 104 and the transmission 10 to surround the first end 120 of the crankshaft 116, the torsional damper 128, and the portion of the input member 12 that protrudes from the housing 68 of the transmission 10.

The ECU 76 is configured to determine the presence or existence of certain predetermined powertrain conditions, such as whether the transmission is in reverse mode and whether the crankshaft is not actively supplying torque to the input member. In the context of the present invention, the engine, i.e., the crankshaft, "actively supplies torque" to the input member when the engine is on and the crankshaft is operatively connected to the input member for substantially unitary rotation. In contrast, the crankshaft passively supplies torque when it merely provides a reaction torque in the opposite direction of input member rotation.

The ECU 76 is configured to cause resistance to input member rotation in response to the presence or existence of the predetermined conditions. More specifically, the ECU controls a device that is configured to selectively resist input member rotation. In the embodiment of FIG. 2, the powertrain 100 includes a device, namely an electromagnetic clutch 136, that is controllable by the ECU 76 and configured to selectively lock the crankshaft 116 with respect to a stationary member such as the engine block 108 and thereby prevent or resist rotation of the crankshaft. Correspondingly, since the crankshaft 116 is substantially continuously connected to the input member 12, the electromagnetic clutch 136 is also configured to selectively prevent or resist rotation of the input member 12.

More specifically, a vehicle user-operated control device, i.e., a drive range selector (not shown), is configured to transmit a signal to the ECU 76 that directs the ECU 76 to configure the transmission for either the park, reverse, neutral, or forward drive range. The ECU is programmed and configured to transmit an actuation signal 140 when the drive range selector commands reverse operation and when the engine does not actively supply torque to the input member 12 via the crankshaft 116, such as when the engine is off, so that only motor/generators 56, 72 supply torque for reverse vehicle movement. The electromagnetic clutch 136 is responsive to actuation signal 140 to prevent rotation of the crankshaft 116, and, correspondingly, the input member 12, thereby to provide reaction torque for the motor/generators.

The electromagnetic clutch 136 is preferably connected to the second end 124 of the crankshaft 116 adjacent a harmonic damper 138. Alternatively, the electromagnetic clutch, shown in phantom at 136', may be operatively connected to the first end 120 of the crankshaft 116 inside the bell housing 132 to selectively ground the crankshaft 116 to the bell housing.

Exemplary electromagnetic clutches are described in U.S. Pat. No. 4,122,930, issued Oct. 31, 1978 to Bennett et al; U.S. Pat. No. 4,428,470, issued Jan. 31, 1984 to Bennett et al; and U.S. Pat. No. 5,377,799, issued Jan. 3, 1995 to Mullaney, each of the aforementioned patents being hereby incorporated by reference in its entirety.

Referring to FIG. 3, wherein like reference numbers refer to like components from FIGS. 1 and 2, an alternative powertrain configuration 100' within the scope of the claimed invention is schematically depicted. The powertrain 100' includes a hydraulically-actuatable torque transfer device, namely friction brake 144, that is controllable by the ECU 76 and configured to selectively lock the crankshaft 116 with respect to a stationary member such as the engine block 108 and thereby prevent or resist rotation of the crankshaft. More specifically, the ECU 76 is configured to send actuation signal 140 to a solenoid operated valve 148. The solenoid-operated valve 148 is spring biased in a closed position in which the valve 148 prevents fluid communication between the brake 144 and transmission pump 88 so that the brake is not actuated and therefore does not lock the crankshaft 116 to the engine block 108. The solenoid-operated valve is responsive to actuation signal 140 such that the valve 148 opens to provide fluid communication between the brake 144 and the transmission pump 88 whereby fluid 152 from the pump 88 actuates the brake 144 to lock the crankshaft 116 to the engine block 108.

The friction brake 144 is preferably connected to the second end 124 of the crankshaft 116 adjacent the harmonic damper 138. Alternatively, the friction brake, shown in phantom at 144', may be operatively connected to the first end 120 of the crankshaft 116 inside the bell housing 132 to selectively ground the crankshaft 116 to the bell housing.

Figure 4:
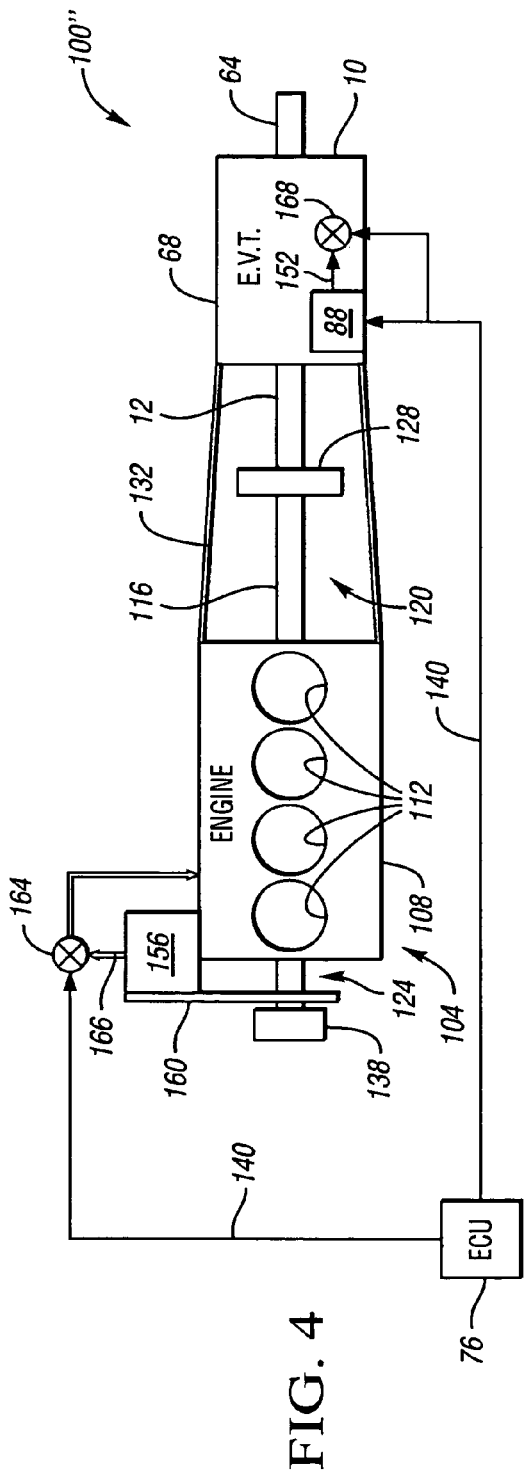
FIG. 4 is a schematic representation of another alternative embodiment of the powertrain of FIG. 2 having an engine cooling pump and transmission pump configured for selective hydraulic lock.

Referring to FIG. 4, wherein like reference numbers refer to like components from FIGS. 1-3, another alternative powertrain configuration 100" is schematically depicted. The powertrain 100" includes an engine cooling pump 156 mounted with respect to the engine block 108 and driven by the crankshaft 116 either directly, via a gear set (not shown), or via a belt 160, chain (not shown), or other flexible drive member. The pump 156 includes a solenoid-operated discharge valve 164 that is controllable by the ECU 76. The solenoid operated discharge valve is configured to close in response to actuation signal 140 from ECU 76, thereby causing hydraulic lock on the pump 156 ("deadheading") and a corresponding increase in pump torque load with resultant resistance to crankshaft rotation. That is, when closed, valve 164 prevents the flow of fluid 166 from pump 156.

Similarly, transmission pump 88 includes a solenoid-operated discharge valve 168 that is controllable by the ECU 76. The solenoid-operated discharge valve is configured to close in response to actuation signal 140 from ECU 76, thereby causing hydraulic lock on the pump 88 and a corresponding increase in pump torque load with resultant resistance to input member rotation.

Figure 5:
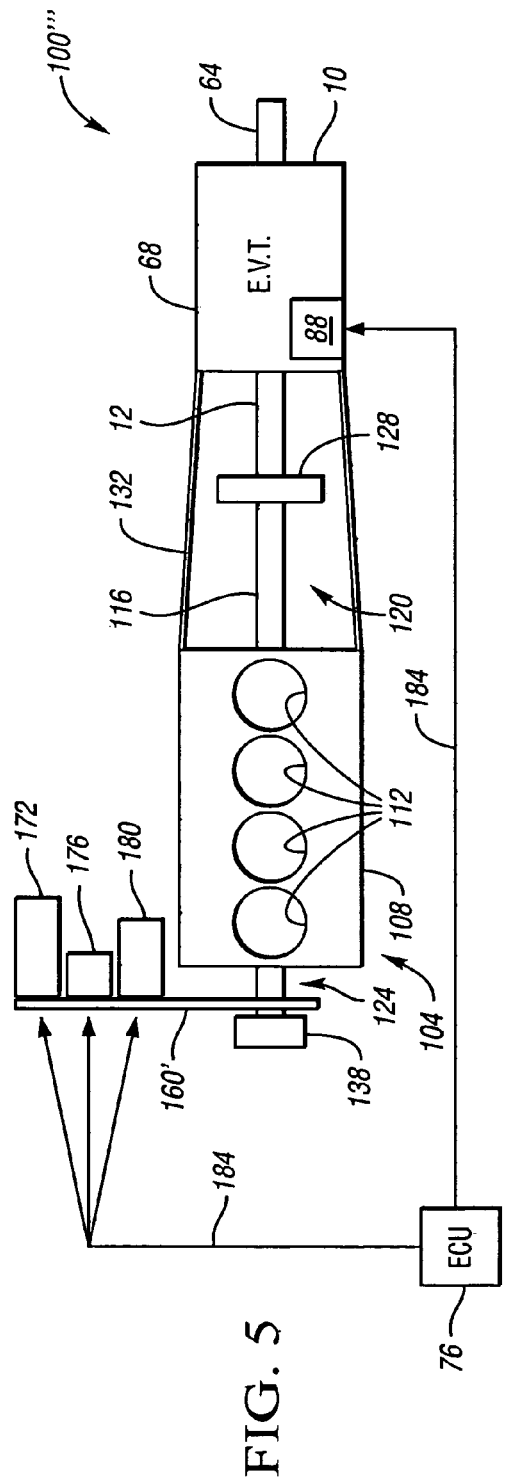
FIG. 5 is a schematic representation of yet another alternative embodiment of the powertrain of FIG. 2 having a plurality of crankshaft-driven accessory components with controllable variable torque loads.

Referring to FIG. 5, wherein like reference numbers refer to like components from FIGS. 1-4, yet another alternative powertrain configuration 100''' is schematically depicted. The powertrain 100''' includes a plurality of accessory components that are driven by the crankshaft 116 via a belt 160', namely an air conditioning compressor 172, power steering pump 176, and alternator 180. The accessory components 172, 176, 180 are controllable by the ECU 76 to vary their respective torque loads, and correspondingly, the resistance to crankshaft rotation. More specifically, ECU 76 is configured to transmit signal 184 to the components 172, 176, 180 whereby the components are commanded to increase their respective torque loads, preferably maximizing their respective torque loads, with a resultant increase in resistance to crankshaft rotation.

Similarly, transmission pump 88 is controllable by ECU 76, and responsive to a signal 184 from the ECU whereby maximum pump flow is commanded with a resultant increase in resistance to input member rotation.

The engine 104 may be characterized by "displacement on demand." More specifically, every cylinder 112 in the engine 104 has a corresponding plurality of selectively activatable and deactivatable cylinder valves (not shown) operatively connected thereto, i.e., inlet and exhaust valves. Every cylinder in the engine is characterized by an operative condition in which the corresponding cylinder valves are activated, and an inoperative condition in which the corresponding cylinder valves are deactivated. Such an engine is described in a commonly-assigned U.S. Ser. No. 10/851,394 filed May 21, 2004, entitled "Hybrid Powertrain with Engine Valve Deactivation," Vahabzadeh et al, and which is hereby incorporated by reference in its entirety.

Those skilled in the art will recognize multiple techniques and valvetrain configurations that may be employed to achieve selective deactivation of the cylinder valves. Exemplary valves configured for selective valve deactivation are described in U.S. Pat. No. 6,321,704, issued Nov. 27, 2001 to Church et al; U.S. Pat. No. 6,321,705, issued Nov. 27, 2001 to Fernandez et al; U.S. Pat. No. 6,497,207, issued Dec. 24, 2002 to Spath et al; U.S. Pat. No. 6,513,470, issued Feb. 4, 2003 to Hendriksma et al; U.S. Pat. No. 6,557,518, issued May 6, 2003 to Albertson et al; U.S. Pat. No. 6,584,951, issued Jul. 1, 2003 to Patel et al; and U.S. Pat. No. 6,637,387, issued Oct. 28, 2003 to Gecim et al, each of which is hereby incorporated in its entirety.

The ECU 76 may be programmed and configured to deactivate inlet and exhaust valves associated with the cylinders 112 so that air and other gases are trapped inside the cylinders 112. The trapped air is compressed by pistons (not shown) when the crankshaft 116 rotates, causing resistance to crankshaft rotation.

While the best modes for carrying out the invention have been described in detail, those familiar with the art to which this invention relates will recognize various alternative designs and embodiments for practicing the invention within the scope of the appended claims.

The invention claimed is:

1. A vehicle powertrain comprising:
    an engine including an engine output member, the engine being characterized by an on condition and an off condition;
    a transmission including a transmission input member continuously connected to the engine output member for rotation therewith, a transmission output member, a geartrain configured to selectively operatively interconnect the transmission input member and the transmission output member, and first and second motor/generators operatively connected to the geartrain to apply power thereto or receive power therefrom;
    a device sufficiently configured to selectively resist or prevent rotation of the transmission input member; and
    a control unit operatively connected to the device and configured to selectively cause the device to resist or prevent rotation of the transmission input member at least partially in response to the engine being in the off condition.

2. The powertrain of claim 1, wherein said device is an electromagnetic clutch.

3. The powertrain of claim 1, wherein said device is a hydraulically-actuated friction device.

4. A vehicle powertrain comprising:
    an engine including an engine output member, the engine being characterized by an on condition and an off condition;
    a transmission including a transmission input member continuously connected to the engine output member for rotation therewith, a transmission output member, a geartrain configured to selectively operatively interconnect the transmission input member and the transmission output member, and first and second motor/generators operatively connected to the geartrain to apply power thereto or receive power therefrom, the transmission being characterized by the absence of an input clutch between the transmission input member and the engine output member; and
    a device sufficiently configured to selectively lock the transmission input member to provide a reaction torque for improved reverse gradeability.

* * * * *